March 3, 1970  R. B. ADAMS  3,498,307
FLOW CONTROL APPARATUS
Filed June 28, 1967  2 Sheets-Sheet 1

INVENTOR
ROBERT B. ADAMS
BY
ATTORNEY

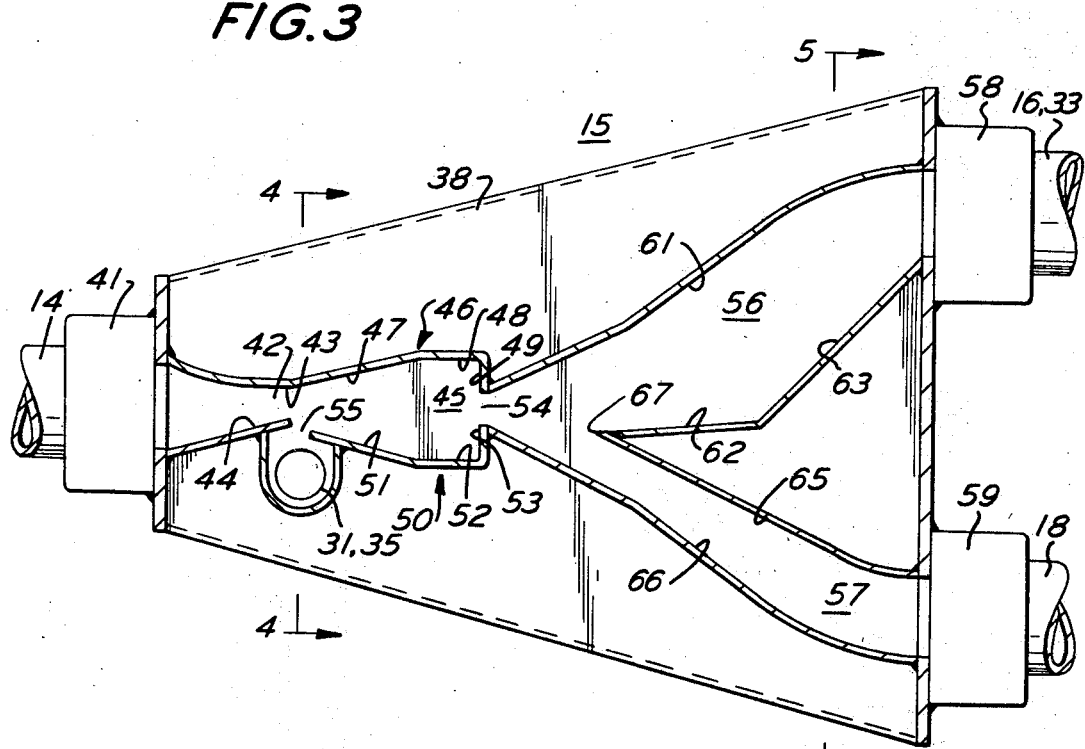
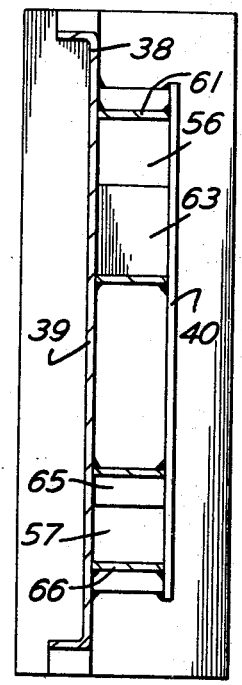
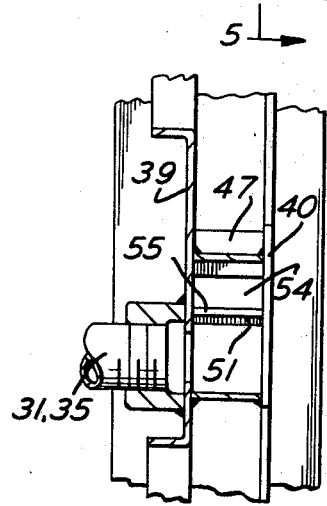

United States Patent Office 3,498,307
Patented Mar. 3, 1970

3,498,307
FLOW CONTROL APPARATUS
Robert B. Adams, Tredyffrin Township, Chester County, Pa., assignor to Moore Products Co., Spring House, Pa., a corporation of Pennsylvania
Filed June 28, 1967, Ser. No. 649,664
Int. Cl. F15c 1/04
U.S. Cl. 137—81.5                8 Claims

ABSTRACT OF THE DISCLOSURE

Flow control apparatus including a diverting valve for fluid flow control with provisions for holding the fluid level available in lines for use, to speed up delivery when fluid is called for.

BACKGROUND OF THE INVENTION

Field of the invention

The invention relates to flow control apparatus which includes a fluid diverting valve for delivering fluid through a fluid line to a location when called for with delivery of the fluid to the sump when not called for, the level being maintained in the line to avoid delay in delivery when the fluid is called for.

Description of the prior art

It has heretofore been proposed, in the U.S. Patent to Joesting, No. 3,159,208, to provide a flow control device with switching by which fluid is directed through a heat exchange coil or bypassed around the coil. No provisions are made for maintaining a level of fluid contiguous to the place of use to avoid delay in delivery. In Joesting also an internal valve element was required to limit aspiration from one leg into another leg.

It has also heretofore been proposed, in the Patent to Hurvitz, No. 3,001,539, to provide an amplifier with a bleed of part of the fluid for switching but this structure will not permit switching all the fluid to one delivery leg unless the control port discharges to a region of pressure below that to which the non-flowing leg is connected.

SUMMARY OF THE INVENTION

It is the principal object of the present invention to provide flow control apparatus in which flow of liquid to a place of use is controlled by a diverting valve when called for and when not called for the liquid is diverted to the sump.

It is a further object of the present invention to provide flow control apparatus which is particularly suited to provide flow of coolant to nozzles on a machine tool while the machining operation is under way and when the machining has been terminated to provide diversion of the coolant to the sump.

It is a further object of the present invention to provide flow control apparatus of the character aforesaid in which no air is aspirated into the liquid delivered for use and in which, during diversion to the sump, the line to the delivery location has fluid therein held at a level to avoid delay when flow is resumed to the place of use.

It is a further object of the present invention to provide flow control apparatus of the character aforesaid in which a simple but effective diverting valve having no moving parts is employed.

It is a further object of the present invention to provide for fluid flow control apparatus a diverting valve having a fluid interaction chamber with two delivery legs therebeyond, one of the legs having a high efficiency recovery section and the other of the legs having a low efficiency recovery section.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 3 is a central sectional view of a preferred form of diverting valve employed with the apparatus shown in FIGS. 1 and 2;

FIG. 4 is a sectional view taken approximately on the line 4—4 of FIG. 3; and

FIG. 5 is a sectional view taken approximately on the line 5—5 of FIG. 3.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Figure 1:
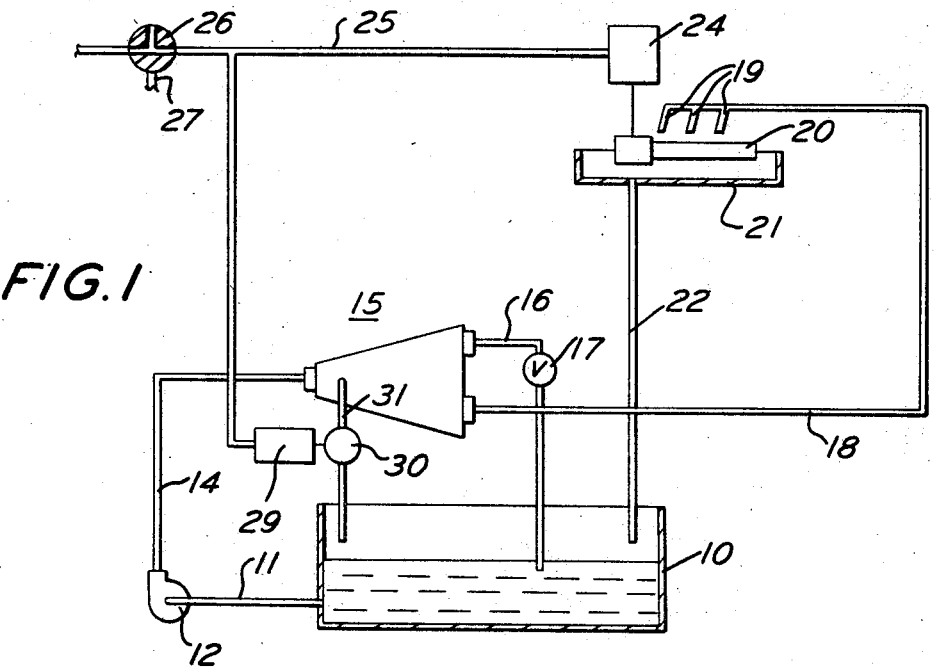
FIGURE 1 is a diagrammatic view of one preferred form of flow control apparatus in accordance with the invention.

Referring now to FIG. 1 of the drawings the flow control apparatus there shown includes a sump 10 which is connected by a pipe 11 to the inlet connection of a pump 12. The delivery side of the pump 12 is connected by a pipe 14 to a diverting valve 15, described in detail below. The valve 15 has a fluid connection 16 which extends to the sump 10 and below the level of the liquid therein, and a valve 17 is provided in the fluid connection for regulating the flow through the fluid connection 16.

The valve 15 has a fluid connection 18 which leads to nozzles 19 for delivering liquid to a work piece 20. A collector pan 21 is connected by a return line 22 to the sump 10.

A pneumatically operated work clamp 24 can be provided to retain the work piece 20 in position, and a fluid connection 25 is provided connected to any suitable source (not shown) for supplying actuating fluid pressure, as desired, to the clamp 24, and as controlled by a clamp control valve 26. The valve 26 can have an exhaust 27 to atmosphere for unclamping. A branch fluid connection 28 extends from the fluid connection 25 to a pneumatic positioner 29 for a valve 30 which is interposed in a fluid connection 31 from the valve 15 to the sump 10 to permit more or less fluid, as desired, to discharge to the sump 10 from the valve 15.

Figure 2:
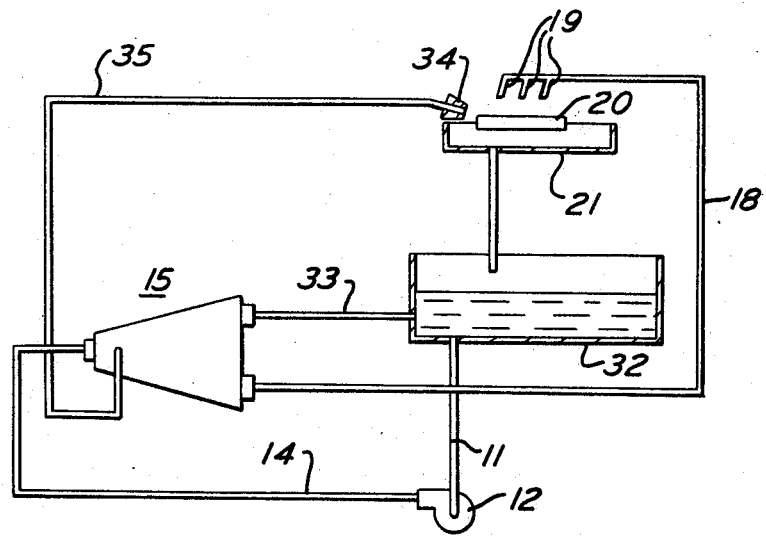
FIG. 2 is a diagrammatic view of another preferred form of flow control apparatus in accordance with the invention.

Referring now to FIG. 2, in the embodiment of the invention there shown a sump 32 at a higher level with respect to the valve 15 is provided, connected as before by a pipe 11 to the pump 12, with pipe 14 extending to the valve 15. A pipe 33 extends from the valve 15 to the sump 32 below the level of the liquid in the sump 32 i.e. below the liquid-gas interface and fluid connection 18 extends to nozzles 19 as before. The collector pan 21 collects liquid from the nozzle 19 and returns that liquid by the return line 22 to the sump 32.

A detector nozzle 34 is provided, controlled by the obstruction thereof such as by the position of the work piece 20a with respect thereto or by a movable member 20a of a machine tool (not shown) in which the workpiece is held for a machining operation. The detector nozzle 34 has a fluid connection 35 extending to the valve 15.

Referring now more particularly to FIGS. 3, 4 and 5, the valve 15 as there illustrated preferably includes a frame 38 with parallel walls 39 and 40. An inlet connection 41 is provided to which the pipe 14 is connected and which communicates with an inclined nozzle 42 bounded by walls 43 and 44. Immediately beyond the nozzle 42 is a fluid interaction chamber 45 bounded on one side by a side wall 46. The side wall 46 has a diverging portion 47, a straight portion 48 and a transverse end wall 49.

The chamber 45 has an opposite side wall 50. The side wall 50 has a diverging portion 51 offset with respect to the nozzle wall 44, a straight portion 52 and a transverse end wall 53 terminated with respect to the end wall 49 to provide an exit opening 54.

The effective cross sectional area for flow through the opening 54 is preferably smaller than the minimum cross sectional area of the nozzle 42 so that a pressure higher than the ambient pressure prevails in the chamber 45.

At the end of the nozzle 42 a take off opening 55 is provided for continuous discharge of liquid. The pipe 31 (FIG. 1) or the pipe 35 (FIG. 2) is connected to the port or take off opening 55, the rate of discharge being determined either by the positioning of the valve 30 or by the partial obstruction of the detector nozzle 34.

It will be noted that the axis of the nozzle 42 is inclined so as to favor or be biased toward the side wall 46.

Beyond the chamber 45 two delivery legs 56 and 57 are provided. The leg 56 has a connection 58 to which the pipe 16 or the pipe 33 is connected, as shown in FIGS. 1 and 2 for liquid delivery to the sump 10 or the sump 32.

The leg 57 has a connection 59 to which the pipe 18 is connected for liquid delivery to the nozzles 19.

The leg 56 has a side wall 61, and respectively opposite diverging and converging side walls 62 and 63 shaped to provide a low efficiency pressure recovery section and a low impedance path therealong. Any preferred shape may be employed although the shape illustrated has been found to serve the purpose.

The leg 57 has opposite diverging side walls 65 and 66 shaped to provide a high efficiency pressure recovery section. A divider 67 is provided between the legs 56 and 57.

The mode of operation will be pointed out having reference first to FIGS. 1 and 3.

Fluid from the sump 10 supplied by pipe 11 is continuously delivered by the pipe 14 to the valve 15. Assume that a work piece 20 is in place and is held by clamp 24 to which pressure has been supplied for actuation by the movement of the valve 26 to clamping position. Fluid is also supplied to the positioner 29 to close or substantially close and permit only a small amount of leakage through the pipe 31.

Fluid from the pipe 14 enters the nozzle 42 and passes into the chamber 45 and is directed as a jet along the walls 47 and 48 and thence through the exit opening 54 to the leg 57. The liquid from the leg 57 is delivered therefrom through the fluid connection 18 and through the nozzle 19 onto the work piece 20 for cooling. The liquid from the work piece 20 is collected in the collector pan 21 and returned through the pipe 22 to the sump 10 for reuse.

The chamber 45, by reason of the selective sizes of the exit opening 54 and the nozzle 42, has a build up of pressure and a portion of the liquid escapes through the port 55 and returns to the sump.

If now the work clamp is released by movement of the valve 26 the pressure at the positioner 29 is relieved and the valve 30 is opened to permit free discharge through the pipe 31. The reduction of pressure at the port 55 causes the jet from the nozzle 42 to leave the walls 47 and 48 and lock onto the walls 51 and 52, leave through the exit opening 54 and pass into the delivery leg 56.

A portion of the fluid will also pass into the leg 57 to build up some pressure therein but not sufficient to deliver liquid to the nozzles 19.

The level of efficiency of the leg will determine the delivery of a part of the total flow into the leg 57. The valve 17, adjusted as desired, reduces the demand made on the leg 56 for low efficiency of recovery and if the recovery rate of the leg 56 is sufficiently low the valve 17 will not be required. If no valve 17 is employed the sump must be higher and reference is made to this in connection with FIG. 2 when the valve is switched for circulation in pipe 33. The low impedance path in the leg 56 provides for holding the pressure at the outlet 59 of the non-circulating leg 57 only slightly higher than that at the outlet 58 of the leg 56. Thus during this portion of the cycle the level in the fluid connection 18 will be held slightly above the liquid-gas interface of the sump 32.

The low recovery section of leg 56 also acts to prevent aspiration from the other leg 57.

A further advantage obtained through the use of a low-efficiency leg is an improved switching speed when switching away from this leg.

Upon manipulation of the valve 26 to the position first described the flow will be changed in the valve 15 for delivery to the workpiece 20. The level of fluid maintained in the pipe 18 is such that delivery through the nozzles 19 is effected with no delay.

Referring now to FIGS. 2 and 3, the mode of operation of this embodiment will now be pointed out.

Fluid from the sump 32 is delivered by the pump 12 through the pipe 14 to the valve 15.

Assuming that a workpiece 20 is in position with respect to the detector nozzle 34 and sufficiently close to restrict the flow from the nozzle 34, flow through the pipe 35 will be restricted.

The nozzle 42 will direct the jet into the chamber 45 along the walls 47 and 48 for discharge through the exit opening 54 and delivery through the delivery leg 57 to the pipe 18 and through the nozzles 19 onto the workpiece. The liquid is collected in the pan 21 and returned to the sump 32 through the pipe 22.

If now, the workpiece 20 is removed, so that free discharge can occur at the detector nozzle 34, free discharge will occur through the port 55 causing the jet from the nozzle 42 to follow the walls 51 and 52 for major delivery into the leg 56 and minor delivery to leg 57 to maintain a head in the pipe 19.

Upon restriction of the detector nozzle 34 as first mentioned, the jet from the nozzle 42 will return to the walls 47 and 48 to effect delivery through the leg 57 as previously explained.

I claim:
1. Flow control apparatus, comprising
 a source of liquid,
 a fluidic valve having
 an inlet,
 two outlets,
 a single control port for controlling the flow conditions at said outlets in accordance with the extent of restriction of said control port, and
 a liquid containing member having a liquid-gas interface,
 one of said outlets being connected to a fluid connection for delivery of liquid to ambient atmosphere at an elevation substantially above said one outlet,
 said liquid-gas interface having its level below that of the delivery end of said fluid connection, and
 the other of said outlets being submerged below said liquid-gas interface.

2. Flow control apparatus as defined in claim 1 in which a flow restrictive device is provided in the other of said outlets.

3. Flow control apparatus as defined in claim 1 in which said liquid-gas interface is above said one outlet.

4. Flow control apparatus as defined in claim 1 in which said source of liquid includes a pump having its inlet connected to said liquid containing member, and the delivery end of said fluid connection is connected to a work piece location on a machine tool for delivery of liquid thereto, and means associated with said machine tool for controlling the obstruction of said control port.

5. Flow control apparatus as defined in claim 1 in which said valve has means for delivering fluid at a lesser pressure to said other outlet than the pressure delivered to said one outlet.

6. Flow control apparatus as defined in claim 5 in which a flow restrictive device is provided in said other of said outlets.

7. Flow control apparatus comprising a sump, a source of liquid connected to said sump for delivery of liquid therefrom, a valve having a nozzle to which said source is connected and providing a liquid jet and a fluid interaction chamber into which fluid is directed by said nozzle, said fluid interaction chamber having side walls, a control port, and an end exit opening, said valve having fluid delivery legs for selective delivery of liquid from said exit opening as determined by the positioning of said jet, one of said legs being shaped to provide a more effective pressure recovery than the other of said legs, the level of the sump being above that of the valve and the other of said legs being directly connected to said sump, and means for controlling the discharge from said control port.

8. Flow control apparatus comprising a source of liquid, a valve having a nozzle providing a liquid jet and a fluid interaction chamber into which fluid is directed by said nozzle, said fluid interaction chamber having side walls, a control port, and an end exit opening, said valve having fluid delivery legs for selective delivery of liquid from said exit opening as determined by the positioning of said jet, one of said legs being shaped to provide a more effective pressure recovery than the other of said legs, the other of said legs having a low impedance path therealong whereby for the condition of flow through said other leg said low impedance path provides communication between the inlet of said one leg and the outlet of said other leg for minimizing the pressure differences therebetween and preventing reverse flow in said one leg, and means for controlling the discharge from said control port.

References Cited

UNITED STATES PATENTS

| | | | |
|---|---|---|---|
| 3,159,208 | 12/1964 | Joesting | 137—815 XR |
| 3,207,168 | 9/1965 | Warren | 137—815 |
| 3,285,262 | 11/1966 | Ernst et al. | 137—815 |
| 3,153,934 | 10/1964 | Reilly. | |
| 3,171,421 | 3/1965 | Joesting | 137—815 |
| 3,187,763 | 6/1965 | Adams | 137—815 |
| 3,232,095 | 2/1966 | Symnoski et al. | 137—815 XR |
| 3,233,522 | 2/1966 | Stern | 137—815 XR |
| 3,250,285 | 5/1966 | Vockroth | 137—815 |
| 3,262,466 | 7/1966 | Adams et al. | 137—815 |
| 3,277,914 | 10/1966 | Manion | 137—815 |
| 3,379,165 | 4/1968 | Mott | 137—815 XR |

SAMUEL SCOTT, Primary Examiner